(12) United States Patent
Fan et al.

(10) Patent No.: US 11,409,555 B2
(45) Date of Patent: Aug. 9, 2022

(54) APPLICATION DEPLOYMENT IN MULTI-CLOUD ENVIRONMENT

(71) Applicant: AT&T Intellectual Property I, L.P., Atlanta, GA (US)

(72) Inventors: James Fan, San Ramon, CA (US); Alireza Hooshiari, Alpharetta, GA (US); Dan Celenti, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 198 days.

(21) Appl. No.: 16/816,933

(22) Filed: Mar. 12, 2020

(65) Prior Publication Data
US 2021/0286638 A1    Sep. 16, 2021

(51) Int. Cl.
| H04L 15/16 | (2006.01) |
| G06F 9/455 | (2018.01) |
| G06F 15/16 | (2006.01) |
| H04L 29/08 | (2006.01) |
| G06F 9/50 | (2006.01) |
| H04L 12/24 | (2006.01) |
| H04L 12/931 | (2013.01) |
| H04L 67/10 | (2022.01) |

(52) U.S. Cl.
CPC .......... *G06F 9/45558* (2013.01); *H04L 67/10* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 67/10
See application file for complete search history.

(56) References Cited

U.S. PATENT DOCUMENTS

| 8,909,744 B2 * | 12/2014 | Rathore | .................... G06F 9/06 709/224 |
| 10,069,694 B1 * | 9/2018 | Schwartz | ................ H04L 67/10 |
| 10,284,634 B2 * | 5/2019 | Burton | ................ H04L 41/0893 |

(Continued)

FOREIGN PATENT DOCUMENTS

| CN | 109155799 A | * | 1/2019 | ............... G06F 9/46 |
| EP | 3652894 B1 | * | 10/2021 | ......... G06F 9/45558 |

(Continued)

OTHER PUBLICATIONS

Deval Bhamare, et al.,"Optimal Virtual Network Function Placement in Multi-Cloud Service Function Chaining Architecture", eprint, Computer Communications, Apr. 2017, pp. 1-18, vol. 102.

*Primary Examiner* — David R Lazaro
*Assistant Examiner* — Berhanu Shitayewoldetadik (57) ABSTRACT

A processing system may obtain a request to deploy a service comprising a first virtual network function (VNF) to a multi-cloud environment comprising cloud infrastructures, the request including metadata associated with the service, decompose the service into a plurality of modules comprising: a plurality of VNFs and/or a plurality of components of the first VNF, select at least a first deployment model for the service from among a plurality of deployment models, based upon the metadata, each deployment model comprising rules for assigning the plurality of modules to cloud infrastructures, and deploy a first module to a first cloud infrastructure and a second module to a second cloud infrastructure.

20 Claims, 3 Drawing Sheets

(56) References Cited

U.S. PATENT DOCUMENTS

| | | | |
|---|---|---|---|
| 10,880,189 B2* | 12/2020 | Martinez | H04L 41/5077 |
| 10,892,944 B2* | 1/2021 | Schardt | H04L 67/10 |
| 11,157,270 B2* | 10/2021 | Mills | G06F 8/38 |
| 2006/0161444 A1* | 7/2006 | Lubrecht | G06Q 10/06395 |
| | | | 705/7.41 |
| 2006/0161879 A1* | 7/2006 | Lubrecht | G06Q 10/06 |
| | | | 717/101 |
| 2009/0300002 A1* | 12/2009 | Thomas | G06F 16/2457 |
| | | | 707/999.005 |
| 2010/0322255 A1* | 12/2010 | Hao | H04L 49/70 |
| | | | 370/398 |
| 2011/0138047 A1* | 6/2011 | Brown | G06F 9/5072 |
| | | | 715/810 |
| 2012/0203823 A1* | 8/2012 | Manglik | H04L 67/1097 |
| | | | 709/203 |
| 2013/0238785 A1* | 9/2013 | Hawk | G06F 9/5077 |
| | | | 709/224 |
| 2014/0068743 A1* | 3/2014 | Marcus | H04L 63/0815 |
| | | | 726/8 |
| 2014/0108639 A1* | 4/2014 | Nelke | G06F 9/5072 |
| | | | 709/224 |
| 2014/0149983 A1* | 5/2014 | Bonilla | G06F 3/0619 |
| | | | 718/1 |
| 2015/0074278 A1* | 3/2015 | Maes | H04L 67/10 |
| | | | 709/226 |
| 2015/0163288 A1* | 6/2015 | Maes | G06F 9/5072 |
| | | | 709/203 |
| 2016/0057209 A1* | 2/2016 | Parikh | H04L 69/321 |
| | | | 709/203 |
| 2016/0119424 A1* | 4/2016 | Kane | H04L 67/10 |
| | | | 709/203 |
| 2016/0205518 A1* | 7/2016 | Patel | H04W 4/08 |
| | | | 455/518 |
| 2016/0261522 A1* | 9/2016 | Hanis | H04L 67/22 |
| 2017/0126500 A1* | 5/2017 | Eggen | H04L 43/0817 |
| 2017/0199752 A1* | 7/2017 | Cao | G06F 9/45558 |
| 2017/0201569 A1* | 7/2017 | Fu | H04L 41/0893 |
| 2018/0205600 A1* | 7/2018 | Burton | H04L 41/0843 |
| 2019/0042297 A1* | 2/2019 | Connor | G06F 9/5027 |
| 2019/0044971 A1* | 2/2019 | Sukhomlinov | G06F 9/45558 |
| 2019/0082004 A1* | 3/2019 | Bosch | G06F 8/60 |
| 2019/0102157 A1* | 4/2019 | Caldato | G06F 11/203 |
| 2019/0303212 A1* | 10/2019 | Bosch | G06F 9/5072 |
| 2019/0327144 A1* | 10/2019 | Tembey | H04L 67/10 |
| 2020/0034206 A1* | 1/2020 | Dimitrov | G06F 9/5077 |
| 2020/0257567 A1* | 8/2020 | Fontanari Filho | G06F 9/45558 |
| 2020/0314139 A1* | 10/2020 | Migault | H04L 63/1441 |

FOREIGN PATENT DOCUMENTS

| | | | | |
|---|---|---|---|---|
| WO | WO-2014145777 A1 * | 9/2014 | | G06F 8/60 |
| WO | WO-2016027999 A1 * | 2/2016 | | G06F 1/1601 |
| WO | WO-2017113201 A1 * | 7/2017 | | G06F 9/45558 |
| WO | WO-2017194990 A1 * | 11/2017 | | G06F 9/45558 |
| WO | WO-2018144060 A1 * | 8/2018 | | G06F 9/5061 |
| WO | WO-2019223867 A1 * | 11/2019 | | G06F 9/5038 |

\* cited by examiner

APPLICATION DEPLOYMENT IN MULTI-CLOUD ENVIRONMENT

The present disclosure relates generally to cloud computing, and more particularly to methods, computer-readable media, and apparatuses for deploying at least a first module of a service to a first cloud infrastructure and at least a second module of the service to a second cloud infrastructure in accordance with a deployment model for the service.

BACKGROUND

A software defined network (SDN) architecture for a telecommunication network may be built upon network function virtualization infrastructure (NFVI) that is capable of being directed with software and SDN protocols to perform a broad variety of network functions and services. Different locations in the telecommunication network may be provisioned with appropriate amounts of network substrate, and to the extent possible, virtual network functions (VNFs) comprising routers, switches, edge caches, middleboxes, and the like, may be instantiated from the common resource pool. These virtual network functions (VNFs), may perform the same or similar functions as the dedicated hardware counterparts. In addition to replacing or complementing traditional physical network resources with VNFs, VNFs may increasingly be deployed to different public clouds.

SUMMARY

Methods, computer-readable media, and apparatuses for deploying at least a first module of a service to a first cloud infrastructure and at least a second module of the service to a second cloud infrastructure in accordance with a deployment model for the service are described. For example, a processing system including at least one processor may obtain a request for a deployment of a service comprising at least a first virtual network function to a multi-cloud environment comprising a plurality of cloud infrastructures, where the plurality of cloud infrastructures includes at least a first cloud infrastructure and a second cloud infrastructure, where the request includes metadata associated with the service. The processing system may then decompose the service into a plurality of modules including at least a first module and a second module, where the plurality of modules comprises at least one of: a plurality of virtual network functions including the at least the first virtual network function or a plurality of components of the at least the first virtual network function. Next, the processing system may select at least a first deployment model for the service, where the at least the first deployment model is selected based upon the metadata, the at least the first deployment model is selected from among a plurality of deployment models, and each of the plurality of deployment models comprises respective rules for assigning the plurality of modules to cloud infrastructures. The processing system may then deploy the first module to the first cloud infrastructure and the second module to the second cloud infrastructure in accordance with the at least the first deployment model that is selected.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure allow providers of cloud-based services and virtual network functions (VNFs) to efficiently deploy their services and VNFs in a multi-cloud runtime environment, eliminating inefficiencies by being vendor agnostic. The present disclosure also provides an environment supporting efficient design and management of physical and virtual resources. More specifically, the present disclosure provides a trusted, multi-level transaction system to enable various clients to share physical and virtual resources, and management of inter-layer dependencies (e.g., among cloud infrastructures, physical resources of various cloud infrastructures, virtual machines and/or containers, services, VNFs, and VNF components). In accordance with the present disclosure, a VNF designer/provider may specify deployment requirements, or preferences, and may avoid having to negotiate with each potential cloud provider individually.

In addition, VNFs may be acquired by service providers, which may have similar desires to know where the acquired VNFs can be deployed to support network operational goals. For instance, services (e.g., service function chains (SFCs)), VNFs, or components thereof may be deployed either to private clouds, public clouds, or a mixture of both. Public cloud providers may also desire to promote resource availability even though VNF or service providers are primarily engaged with one or more other cloud providers. The present disclosure provides a system to support VNF providers', service providers', and cloud providers' respective interests. In particular, examples of the present disclosure facilitate and manage resource usages, entitlements, and performance measurements between and among VNF providers, service/application provider, and various corresponding cloud infrastructure providers.

To offer services composed of VNFs, VNF designers may accommodate their clients' reliance on multiple cloud providers. The cost to cover the overhead of managing the interactions with cloud providers may be substantial, and the processes themselves may be prone to inefficiencies that contribute to unnecessary deployment delays. VNF designers may also rely upon the cloud providers' reporting systems for tracking and monitoring the utilization of their physical and virtual resources (e.g., host devices, hypervisors, virtual machine monitors (VMMs), virtual machines (VMs), containers, and so forth). Reliance on these systems may involve additional development to integrate feedback information into the VNF design environment. This task may be further complicated when multiple cloud providers are involved, given the proprietary nature of the monitoring systems and the desire to synchronize the feedback across different clouds. Application/service providers which acquire VNFs from VNF designers may have similar challenges to those faced by designers of individual VNFs. In addition, cloud providers which offer both physical and virtual resources and competing peers may also have a desire to advertise their offerings to a common trusted platform to attract service providers or VNF designers to run VNFs within their respective cloud infrastructures.

In one example, the present disclosure comprises a system that may include a Multi-layer Resource Management Platform (MRMP) (e.g., a processing system including one or more hardware processors and associated memory, storage, and so forth) to facilitate deployment and tracking of physical and virtual resources across a multi-cloud environment (e.g., comprising one or more "clouds" or cloud infrastructures provided by different cloud providers). In one example, the MRMP enables VNF providers to specify VNF deployment preferences. VNFs will be assigned to and placed in the most suitable cloud infrastructure. For VNFs which are chained together to provide a specific function, individual VNFs may be placed and run in different clouds. Even in a situation that the deployment involves only a single VNF, efficient design may involve some of the VNF's component modules being deployed in different clouds.

In one example, deployed VNFs may be tracked by a Multi-layer Resource Linker MRL (e.g., comprising the same or a different processing system as the MRMP) to maintain data regarding trust, security, and lifecycle status. The MRL may maintain such data even after VNFs are removed from operation or VMs/containers used to support running the VNFs have been scaled down. Thus, based on assigned priorities and contractual arrangements, VNF providers and service providers may track and monitor all the resources assigned to and supporting their VNFs and/or services via the MRL. In accordance with the present disclosure, VNF designers/providers and/or service providers may track and monitor the utilization of their VNFs and services, the underlying physical and virtual resources of different clouds supporting the VNF and/or service deployments, and so forth in single or multi-cloud environments.

In one example, the level of visibility into interconnected resources is based on preset (and pre-selected) policies. In one example, each placement, or deployment decision may cause a new record to be added to the MRL without compromising the existing data. In one example, the MRL also comprises a plug-in capability to allow specific information to be inserted into each added record based on a VNF provider's or service provider's unique preferences. The custom added information may be maintained privately for the requester without impact on the overall structure of the linked dataset that is accessible to others. These and other aspects of the present disclosure are described in greater detail below in connection with the examples of FIGS. 1-3.

Figure 1:
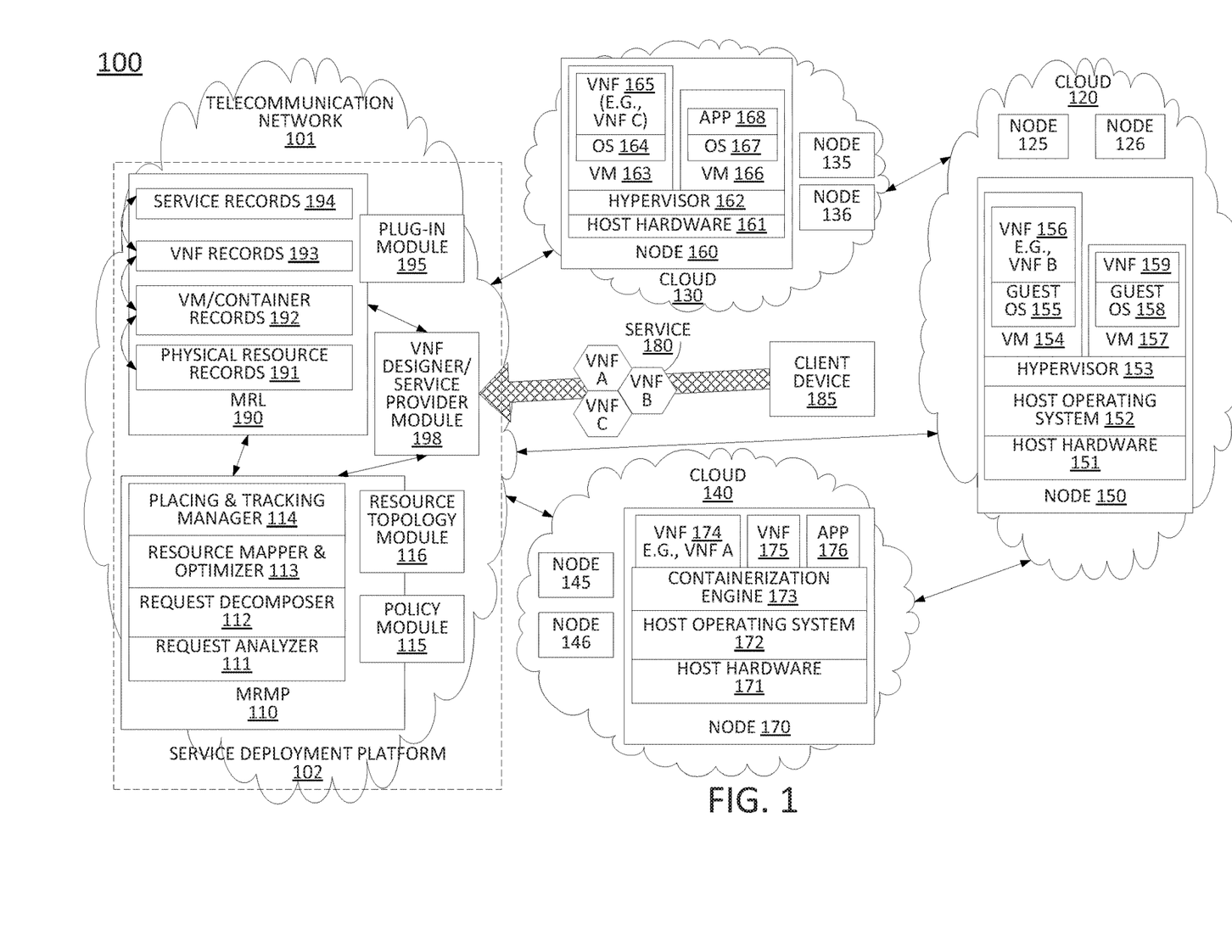
FIG. 1 illustrates an example network related to the present disclosure.

To further aid in understanding the present disclosure, FIG. 1 illustrates an example system 100 in which examples of the present disclosure for deploying at least a first module of a service to a first cloud infrastructure and at least a second module of the service to a second cloud infrastructure in accordance with a deployment model for the service may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 101. The telecommunication network 101 may be in communication with one or more clouds 120, 130, and 140 (e.g., cloud infrastructure), and the Internet (not shown). In one example, telecommunication network 101 may combine core network components of a cellular network with components of a triple play service network; where triple-play services include telephone services, Internet services and television services to subscribers. For example, telecommunication network 101 may functionally comprise a fixed mobile convergence (FMC) network, e.g., an IP Multimedia Subsystem (IMS) network. In addition, telecommunication network 101 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 101 may further comprise a broadcast television network, e.g., a traditional cable provider network or an Internet Protocol Television (IPTV) network, as well as an Internet Service Provider (ISP) network. In one example, telecommunication network 101 may include a plurality of television (TV) servers (e.g., a broadcast server, a cable head-end), a plurality of content servers, an advertising server (AS), an interactive TV/video on demand (VoD) server, and so forth. For ease of illustration, various additional elements of network 101 are omitted from FIG. 1.

In one example, the clouds 120, 130, and 140 may each comprise a "public" cloud or "private" cloud. For instance, one or more of clouds 120, 130, or 140 may be controlled by a same entity as telecommunication network 101. In such an example, the one or more of clouds 120, 130, or 140 may be considered part of the telecommunication network 101. Alternatively, or in addition, one or more of clouds 120, 130, or 140 may be controlled by and/or operated by another entity providing cloud computing services to clients/subscribers. In any case, the nodes 125, 126, 135, 136, 145, 146, 150, 160, and 170 may comprise servers hosting virtualization platforms for managing one or more virtual machines (VMs), containers, microservices, or the like.

In one example, one or more of the clouds 120, 130, or 140 may comprise access networks. In such case, the cloud(s) 120, 130, and/or 140 may be referred to as an edge cloud, or edge clouds. For instance, one or more of clouds 120, 130, and 140 may comprise cellular/wireless access networks, e.g., radio access networks (RANs), such as a Universal Terrestrial Radio Access Network (UTRAN), an evolved UTRAN (eUTRAN), or the like. In such an example, the system 100 may comprise an LTE network, and the telecommunication network 101 may comprise an Evolved Packet Core (EPC) network, for instance. In addition, where the clouds 120, 130, and 140 comprise radio access networks, the nodes 125, 126, 135, 136, 145, 146, 150, 160, and 170, and other components of the respective clouds 120, 130, and 140 may be referred to as mobile edge infrastructure. However, in other, further, and different examples, any one or more of the clouds 120, 130, or 140 may alternatively or additional comprise a Digital Subscriber Line (DSL) network, a broadband cable access network, a (non-cellular) wireless access networks (e.g., an Institute for Electrical and Electronics Engineers (IEEE) 802.11/Wi-Fi network and the like), and so forth. For example, the operator of telecommunication network 101 may provide a cable television service, an IPTV service, or any other types of telecommunication service to subscribers via the system 100.

As mentioned above, each of clouds 120, 130, and 140 may include a plurality of nodes, e.g., nodes 125, 126, 135, 136, 145, 146, 150, 160, and 170. The nodes 125, 126, 135, 136, 145, 146, 150, 160, and 170 may comprise servers hosting virtualization platforms for managing one or more virtual machines (VMs), containers, microservices, or the like. For example, the nodes 125, 126, 135, 136, 145, 146, 150, 160, and 170 may comprise servers/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth, which may be made available to host client services. In one example, client devices may interact with respective clouds 120, 130, and 140 via respective application programming interfaces (APIs). For instance, a client device may request instantiation of applications or services on the respective clouds 120, 130, and/or 140. However, as noted above, to offer services composed of VNFs, VNF designers may accommodate their clients' reliance on multiple cloud providers. The cost to cover the overhead of managing the interactions with cloud providers may be substantial, and the processes themselves may be prone to inefficiencies that contribute to unnecessary deployment delays.

In accordance with the present disclosure, telecommunication network 101 may provide a service deployment platform 102 to manage, facilitate deployment of, and track physical and virtual resources across a multi-cloud environment (e.g., comprising the one or more clouds 120, 130, and 140). For instance, Multi-layer Resource Management Platform (MRMP) 110 (e.g., comprising a processing system including one or more hardware processors and associated memory, storage, and so forth) of service deployment platform 102 enables VNF providers to specify VNF deployment preferences. MRMP 110 may then determine the most suitable cloud(s) for VNF deployments (e.g., among clouds 120, 130, and 140). For VNFs which are chained together to provide a specific function, individual VNFs may be placed and run in different clouds. For instance, client device 185 may submit a request for deployment of service 180 comprising VNFs A, B, and C (e.g., a SFC).

In one example, deployed VNFs may be tracked by a Multi-layer Resource Linker MRL 190 of service deployment platform 102 (e.g., comprising the same or a different processing system as the MRMP 110) to maintain data regarding trust, security, and lifecycle status for various resources of the multi-cloud environment (e.g., comprising clouds 120, 130, and 140). The MRL 190 may maintain records of the multi-cloud environment in a plurality of layers, such as a physical resource layer, a virtualization platform layer, a virtual machine/container layer, and a service layer. For example, as illustrated in FIG. 1, MRL 190 may store physical resource records 191, which may relate to utilization and/or availability of various physical resources. The physical resources may comprise host devices of the respective clouds 120, 130, and/or 140, and/or any one or more components thereof, such as processors, cores, memory, graphics processing units, storage, network interface cards/components (NIC), and so forth. Similarly, MRL 190 may maintain VM/container records 192, which may relate to the utilization and/or availability of various virtualization platform resources, such as hypervisors, virtual machine monitors (VMMs), container runtimes (e.g., Docker Engine), or the like. It should be noted that VM/container records 192 may also maintain data regarding host operating systems, guest operating systems, and so forth. However, in another example, MRL 190 may store separate records for such resources (e.g., in an additional layer). As further shown in FIG. 1, MRL 190 may store VNF records 193 relating to VNFs which may be hosted by and which may operate on the virtualization platforms and physical resources of the clouds 120, 130, and/or 140. In an additional layer, MRL 190 may also store service records 194 which relate to various services composed of one or more VNFs that may be deployed on the resources of clouds 120, 130, and/or 140. For instance, the service records 194 may include, for a given service, the overall/end-to-end performance of the service, such as end-to-end latency of the service, for an ongoing service, the elapsed utilization of various sub-resources, the current cost incurred, etc., for a closed service, the total utilization, the overall cost, and so on.

In one example, the nodes 125, 126, 135, 136, 145, 146, 150, 160, and 170 may be configured to receive and respond to requests for availability from MRMP 110, to provides offers to host client services, to respond to instructions/requests from MRMP 110 to host client services, to obtain images, code, application/service data, media content, and other data to instantiate and host a client service from MRMP 110 or from one or more network repositories storing such data, to respond to instructions from MRMP 110 to release client services, and so forth. In one example, the nodes 125, 126, 135, 136, 145, 146, 150, 160, and 170 may also be configured to interact with client devices, such as client device 185, in connection with the client service(s) instantiated thereon. However, in another example, all client services for client device 185 may be managed via the MPRP 110 (and MRL 190, for reporting and tracking).

In one example, one or more of the nodes 125, 126, 135, 136, 145, 146, 150, 160, or 170 may also comprise network function virtualization infrastructure (NFVI), e.g., for software defined network (SDN) services of an operator of the telecommunication network 101 and/or the system 100 in general, such as virtual mobility management entities (vMMEs), virtual serving gateways (vSGWs), or other virtual network functions (VNFs). In such an example, the service provider VNFs may be logically separated from any services of other entities which may be allowed to be instantiated on the same cloud infrastructure. In another example, the nodes hosting non-NFV services (e.g., nodes 125, 126, 135, 136, 145, and 146) may be collocated with, but physically separate from any such nodes which may comprise NFVI for service provider functions/VNFs (e.g., nodes 150, 160, and 170).

The nodes 125, 126, 135, 136, 145, 146, 150, 160, and 170 may provide and support various types of virtualization technologies. For instance, there are two primary types of hypervisor/virtual machine monitor (VMM)-based computing device virtualization architectures. The first comprises a VMM, also referred to as a hypervisor, which is installed at a logical layer directly on top of the device hardware. The hypervisor accesses the device hardware via a designated hardware interface, such as Industry Standard Architecture (ISA) hardware interface. The hypervisor presents a virtual hardware interface to one or more guest operating systems, or containers. From the perspective of the guest operating systems, VMs, and/or containers, it appears as if the interactions are directly with the device hardware via the hardware interface. The guest operating systems, VMs, or containers may be unaware that the device hardware has been virtualized, and possibly shared among several guest operating systems, VMs, and/or containers. An example of this architecture is shown with respect to node 160. For instance, a hypervisor 162 (or VMM) is deployed on the host hardware 161 and in operation on node 160. The hypervisor 162 may have instantiated and may manage two virtual machines (VMs), e.g., VM 163 and VM 166. The VMs 163 and 166 may comprise respective operating systems 164 and 167 (e.g., "guest operating systems") which may provide functional environments for respective applications, services, etc. For instance, VM 163 may provide for an instantiation of VNF 165, while VM 166 may provide for an instantiation of application ("app") 168.

The second type of hypervisor/VMM-based device virtualization architecture involves the hypervisor, or VMM, installed at a logical layer between a host operating system and one or more guest operating systems, or containers. The hypervisor accesses device hardware through privileged calls via the host operating system. Similar to the first type of virtualization architecture, the hypervisor in the second type of device virtualization also presents a virtual hardware interface to the guest operating system(s), VM(s), and/or container(s). An example of this architecture is shown with respect to node 150. For instance, a hypervisor 153 (or VMM) may be instantiated via host operating system 152 that is deployed on host hardware 151 and in operation on node 150. The hypervisor 153 may have instantiated and may manage two virtual machines (VMs), e.g., VM 154 and VM 157. The VMs 154 and 157 may comprise respective operating systems, e.g., "guest operating systems" 155 and 158 which may provide functional environments for respective applications, services, etc. For instance, VM 154 may provide for an instantiation of VNF 156, while VM 157 may provide for an instantiation of VNF 159.

It should be noted that in other examples, a different type of a virtualization controller/layer may be utilized, such as a container engine or "runtime" (e.g., a Docker Engine, lmctfy, libcontainer, or the like). For instance, in such examples, instead of a VM, a "container" or similar virtualized component may be instantiated. An example of this type of virtualization architecture is shown with respect to node 170. For instance, a containerization engine 173 or "runtime" may be instantiated via host operating system 172 that is deployed on host hardware 171 and in operation on node 170. The containerization engine 173 may have instantiated and may manage one or more containers for VNFs, applications, microservices, etc. For instance, there may be three containers for VNF 174, VNF 175, and an application (app) 176.

Figure 3:
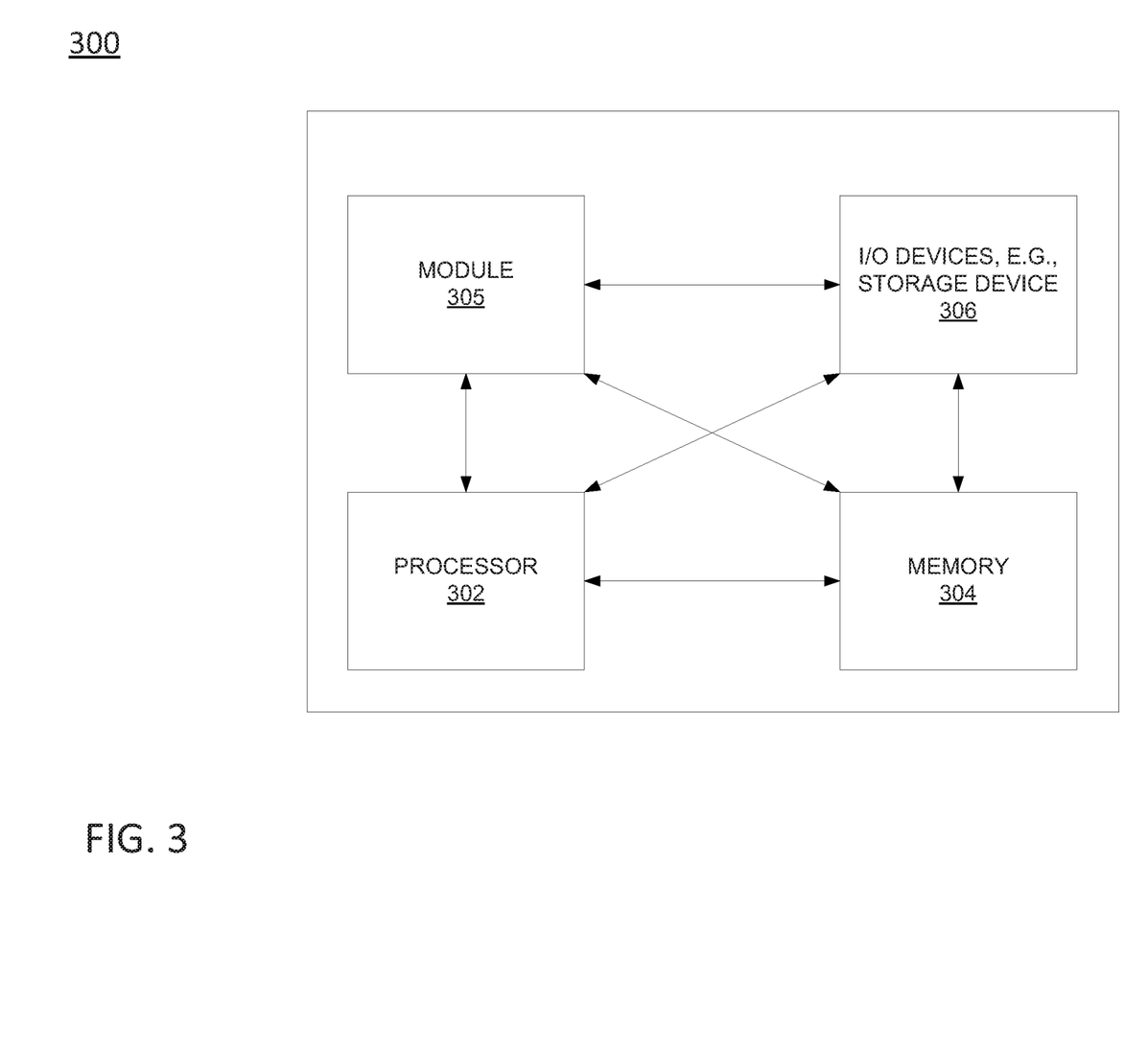
FIG. 3 illustrates a high level block diagram of a computing device specifically programmed to perform the steps, functions, blocks and/or operations described herein.

In one example, each of nodes 125, 126, 135, 136, 145, 146, 150, 160, and 170 may comprise a computing system or server, such as computing system 300 depicted in FIG. 3, and may be configured to provide one or more operations or functions in connection with examples of the present disclosure for deploying at least a first module of a service to a first cloud infrastructure and at least a second module of the service to a second cloud infrastructure in accordance with a deployment model for the service, as described herein.

In addition, the MRMP 110 and MRL 190 may each comprise, or may collectively comprise (e.g., as service deployment platform 102) a computing system or server, such as computing system 300 depicted in FIG. 3, and may be configured to provide one or more operations or functions for deploying at least a first module of a service to a first cloud infrastructure and at least a second module of the service to a second cloud infrastructure in accordance with a deployment model for the service, as described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, a VNF designer/service provider module 198 provides a server front-end for entry of service deployment requests. For instance, VNF designer/service provider module 198 may provide a user interface for entry of request for service deployment, may provide APIs for submission of deployment requests from other devices, such as components of telecommunication network 101 and/or other automated systems, and so forth. Accordingly, the VNF designer/service provider module 198 may forward the requests for deployment to the MRMP 110. It should be noted that in one example, the VNF designer/service provider module 198 may alternatively or additionally comprise part of the MRMP 110 and/or the MRL 190.

The MRMP 110 may comprise several components, or modules, which may all be involved in handling service deployment requests, including: a request analyzer 111, a request decomposer 112, a resource mapper and optimizer 113, and a placing and tracking manager 114. For instance, each component/module may comprise respective code, executable images, etc., that can be loaded into memory and executed by one or more processors to collectively comprise an operational MRMP 110. A request for service deployment may first be processed by the request analyzer 111 after receipt from the VNF designer/service provider module 198. For example, the request analyzer 111 may analyze the request (including information (e.g., metadata) of the service, the VNFs of the service, the sub-components thereof, etc.) to determine how to process the request. The request analyzer 111 may invoke the resource topology module 116 and policy module 115 (e.g., a policy repository) to start initial analysis of the request. For example, the policy module 115 may preload a set of policies to assist the request analyzer 111 in this task. For example, the policy module 115 may store policies (e.g., "sensitivity policies") from the telecommunication network 101 and/or customers thereof regarding various rules that may pertain to the deployment of services via the service deployment platform 102 (e.g., overall), rules that may pertain to the deployment of services for specific customers or classes of customers, e.g., law enforcement customers, banking customers, healthcare customers, retail business customers, etc. The resource topology module 116 may store and may provide utilization data (e.g., performance, availability, etc.) regarding clouds 120, 130, and 140 and the physical and virtual resources thereof.

The analysis of a request may be based on the complexity and or specialty of the request and may include one or more of: a sizing analysis, a complexity analysis, a cost analysis, and a special rule analysis. To illustrate, the sizing analysis may include determining the scope/size of the request by first comparing the request to existing sizing models. Sizing models may include a duration of service (e.g., as indicated in the request), traffic volume anticipation, server requirements or preferences, redundancy requirements or preferences, latency requirements or preferences, and so forth. The output of the request analyzer 111 may be a decision of whether or not a decomposition is to be performed. In one example, the sizing models may be prebuilt by an administrator of the service deployment platform 102. In one example, machine learning recommendations may be generated to fine tune each pre-set parameter(s) for the sizing model(s). For example, a "small cross-cloud model" may be defined as a maximum of 50 servers and/or 200 CPUs with a maximum of 3 seconds response time. However, via machine learning, the MRMP 110 may determines that the maximum number of servers should be increased to 75, the maximum response time should be decreased to 2.5 seconds, etc. In one example, the sizing model parameters may be automatically adjusted accordingly. In another example, the changes may be recommended for approval, e.g., by the administrator of the service deployment platform 102.

As noted above, request analyzer 111 may perform a complexity analysis. To illustrate, a request may be for deployment of a service that includes only two VNFs, but each VNF may include three VNF components (VNFCs or "sub-components"). In addition, two sub-components of a first VNF may have a latency requirement of 10 milliseconds. While the entire SFC/service may have a latency requirement of 5 seconds, this request may nevertheless be tagged as "complex in latency." When this request is forwarded to request decomposer 112, the request decomposer 112 may then decompose based on latency rules. For instance, the two sub-components with the 10 ms latency requirement may be requested to be deployed/hosted with special containers supported with a GPU/CPU combination.

Alternatively, or in addition, request analyzer 111 may perform a cost analysis. For instance, if metadata of an incoming request provides economic criteria (such as, "least cost after peak hour" and "moderate cost during peak hour"), the request analyzer 111 may flag the request for the request decomposer 112 with "economic decomposition" instead of "performance decomposition." In this case, the request decomposer 112 may decompose the request in a way that can meet the economic condition (e.g., as an alternative to or in addition to a special decomposition to meet performance constraints).

In one example, request analyzer 111 may also perform a special policy/rule analysis, which may involve determining if any special rules buttons/flags in the request is/are checked/marked. Alternatively, or in addition, the special rule analysis may include checking internal rules for the particular requesting customer or organization. For instance, a law enforcement customer, a customer processing medical information, a banking customer, etc. may request to run a secured VNF which can only be run in a particular region, which can only be run on physical resources that are not shared with others (e.g., no other VMs, VNFs, microservices, or the like for other customers may be hosted on the physical resource(s) at the same time), and so forth.

A request may next be processed by MRMP 110 via the request decomposer 112. For instance, the request decomposer 112 may decompose the request to facilitate deployment of the service by decomposing the chain of VNFs into blocks of one or more VNFs, and/or by decomposing individual VNFs into sub-components. In particular, the request decomposer 112 may decompose the service into sub-modules (if indicated) and the resulting sub-modules, along with associated performance criteria, may be forwarded to resource mapper and optimizer 113. To illustrate, the request decomposer 112 may receive a request along with the output of the request analyzer 111, e.g., indicating which type of decomposition model to apply. In most instances, the decision to implement decomposition is determined by the initial analysis above with a flag. The primary function of the request decomposer 112 is to determine how to decompose the service for deployment. In one example, the decomposition follows a predetermined ruleset. For example, if a request is flagged as an "economic request," the request decomposer 112 may use a pricing table to determine how many and which components of the service, e.g., VNFs and/or VNF sub-modules, should be decomposed. Each decomposed piece that is selected may then be treated as a separately deployable piece. If, however, initial analysis determines that the request for service deployment is a complex task (e.g., having "latency complexity," etc.), the request decomposer 112 may calculate response times with a list of prebuilt models. The request decomposer 112 may invoke each prebuilt model to compute a respective decomposition result. After each model provides a decomposed result (e.g., one model may decompose to the VNFC/sub-component level, while another model may decompose only to the VNF level, but tripping the CPU requirement(s) for each container), the candidate decomposition results may then be run through a latency calculator and an economic calculator. The best performing result (e.g., in terms of latency, economics, a scaled combination of these factors, etc.) may then be selected by the request decomposer 112 and provided as an output/result to the resource mapper and optimizer 113.

It should be noted that polices of policy module 115 can override machine learning/AI decisions. For instance, a customer may notify the operator of telecommunication network 101 and service deployment platform 102 that services for this customer may only be deployed to physical resources in the United States and/or only to clouds controlled by entities domiciled in the United States. These preferences/requirements can then be written into network-level policy that is loaded to policy module 115. If the resource mapper and optimizer 113 determines that a deployment model is recommending/selecting to run one or more components outside of the United States, this recommendation may be overruled by the resource mapper and optimizer 113 in accordance with policy. It should be noted that similar preferences/requirements may also be written into metadata of the service, metadata of the VNFs or other components thereof, or metadata of the request for deployment of the service (e.g., for application on a per-service or per-request basis, for redundancy purposes, etc.).

Following the decomposition of the request via request decomposer 112, the resource mapper and optimizer 113 may decide where to deploy the service, e.g., the VNFs thereof and/or the sub-components of one or more of the VNFs. For instance, the resource mapper and optimizer 113 may leverage the policy module 115 and the resource topology model 116 to determine the right deployment model to select or suggest from among a plurality of available deployment models (e.g., least cost, high availability, best available cloud platform to be hosted on, etc.). The right deployment model may be selected in accordance with considerations of individually deployable components (e.g., on a module-by-module basis) as well in consideration of the end to end latency constraints, etc.).

In one example, deployment models may be predefined by the administrator of the service deployment platform 102. A deployment model can be simple, such as "one cloud only," which may result in deploying all VNFs and/or sub-components to a single cloud provider with overflow traffic also being assigned to the same cloud provider. For instance, this strategy may be implemented as the "least cost deployment model" noted above. Whichever of clouds 120, 130, or 140 that can meet the requirement(s) and that charges the least in fees may be selected. Another deployment model may be a "diverse model." For instance, each VNF and/or sub-component of the service may be deployed to a different cloud provider to maximize the diversity. In one example, if a new request has similar performance requirements/preferences and/or complexity as compared to previous service deployment requests from one or more different requestors, resource mapper and optimizer 113 may compare performance and economics of the new request to the requests that are already up and running.

In one example, the placing and tracking manager 114 sends deployment requests for VNFs or components thereof to different clouds 120, 130, and 140, and keeps tracks of the success or failure of each placement. In one example, each of clouds 120, 130, and 140, respectively, may provide corresponding application programming interfaces (APIs) to support the request(s) from the placing and tracking manager 114 and the sending of acknowledgements back to the placing and tracking manager 114. Placing and tracking manager 114 may use suggestions from the resource mapper and optimizer 113 to place appropriate modules/components to the corresponding cloud(s) 120, 130, and/or 140. For instance, placing and tracking manager 114 may use the APIs or the like that may be provided by the respective clouds 120, 130, and 140 for submission of deployment requests, for providing images, executables, and supporting data that may be deployed to host devices of the respective 120, 130, and/or 140 so as to provide operational services, VNFs, sub-components, etc., or for providing instructions to the respective clouds 120, 130, and/or 140 as to where the service components may be obtained (such as from a network-based storage of telecommunication network 101 or in a designated storage location that is accessible via the Internet in general), and so forth. After the deployment process is complete, placing and tracking manager 114 may build a traffic load with associated test cases to test performance related criteria, e.g., to confirm that the selected placement may achieve the anticipated requirements and/or preferences relating to performance (e.g., latency, uptime, throughput, etc.), cost, and so forth.

In one example, when the placing and tracking manager 114 receives acknowledgement from cloud(s) 120, 130, and/or 140, the placing and tracking manager 114 may invoke an API to request the MRL 190 to add one or more records for the newly deployed resource(s). For instance, in one example, the placing and tracking manager 114 may establish a tracking model to be inserted into the MRL 190. In one example, the acknowledgement(s) coming back from the cloud(s) 120, 130, and/or 140 may include details for tracking the record(s). In one example, each placement/deployment decision may cause a new record, or records, to be added without compromising the existing data. In addition, in one example, the key portion of each record in the MRL 190 is trusted and cannot be altered by any party using, sharing, and or paying for the associated resource(s) in use.

For a deployed service, the MRL 190 may proactively validate all linkages for the deployed VNFs and/or sub-components of the service. In case of cloud-initiated resource re-allocation or overflow, the MRL 190 may keep track of such changes in the related records. When deviation occurs, the associated linages among data records of MRL 190 may also be established or updated. In this regard, it should be noted that placing and tracking manager 114 may also move various components of a deployed service to different clouds based on time of day costs, e.g., use United States overnight, then switch to Japan during daytime in the United States so as to perform computations in lower cost locations. The request metadata, the service metadata, and/or VNF metadata can specify preferences for parts of the day. However, if not specified, then the placing and tracking manager 114 can analyze and select based on other criteria.

As noted above, the service providers, VNF designers/providers, and cloud providers have a common repository in MRL 190 to obtain a single trusted view of what is occurring in the multi-cloud environment (or what has occurred in the multi-cloud environment). The data records of MRL 190 can be used to resolve billing issues among interested parties, to troubleshoot performance issues, and so forth. In one example, the VNF designer/service provider module 198 also enables VNF providers and/or service providers to visualize and/or perform additional analytics with regard to the linked dataset, e.g., in addition to obtaining submissions of requests for VNF and/or SFC deployments. In one example, the level of visibility into interconnected resources is regulated by the VNF designer/service provider module 198 and MRL 190 based on preset (and pre-selected) policies (e.g., as selected by the administrator of the service deployment platform 102). For instance, in one example, VNF providers or service providers may deploy plug-in modules, such as plug-in module 195, for customization of one or more corresponding linked datasets. In one example, customization may allow addition to and/or aggregation of the data block(s), but the key portions and/or raw data cannot be altered. These added data field(s) may remain confidential to the entity requesting the retention of such additional data field(s), with no impact on the overall structure of the linked dataset. In addition, for shared resources, there may be multiple custom/added data fields associated with a same record in accordance with different VNF providers' and/or service providers' plug-in modules (while remaining segregated in accessibility to the respective requesting entities). Thus, the MRL 190 may execute such plug-in module(s) to gather, collect, and store additional data and/or to aggregate or process data as specified by the client.

It should be noted that in one example, additional entities may also have access to and may obtain data records of MRL 190, such as providers of VMs, hypervisors/VMMs, containers, container runtimes, or the like, providers of physical resources, such as the operators of clouds 120, 130, and 140, server manufacturers, manufacturers of central processing units (CPUs), graphics processing units (GPUs), memory components, storage components, network cards, and so on. The level of access and the corresponding records that may be made available to these various entities may be managed according to policies established by the administrator of the service deployment platform 102. It should be noted that all participants may opt-in to performance tracking and manipulation of VNF deployments via the service deployment platform 102. In this regard, requests for service deployment may also include a metadata flag that may indicate that tracking should be disabled for a particular service and/or any components thereof. In such case, placing and tracking manager 114 may omit creating one or more data records in MRL 190, may indicate a limited retention of such data records (e.g., for billing purposes, only until the service is wound down), and/or may implement a more restricted accessibility of the relevant data record(s).

To further illustrate the functions of MRMP 110 and MRL 190, an example of client device 185 submitting a request for deployment of a service 180 is shown in FIG. 1. For illustrative purposes, the service 180 may be composed of VNF A, VNF B, and VNF C, and may provide a machine learning (ML)-based network traffic alert. For instance, VNF A may be to provide an initial filtering of traffic based upon one or more packet header values. Next, VNF B may be to apply a machine learning algorithm (MLA) to generate and/or update a machine learning model (MLM), such as a classifier, or the like, in accordance with certain characteristics of the traffic that is filtered by VNF A. Lastly, VNF C may be to apply the MLM from VNF B to analyze network traffic, to provide alerts, and so forth. The different VNFs A, B, and C may be provided by different vendors and may be assembled into the service 180.

The request may include metadata regarding the service 180, the VNFs A, B, and C, etc., such as performance requirements (e.g., minimum CPU resources, preferred level of CPU resources, memory requirements and/or preferences, latency requirements and/or preferences, etc.), geographic restrictions, other flags/indicators, such as an "economic request" flag, a "maximum performance request" flag, or the like, time of day information, such as indicators of increased overnight loads and minimal daytime loads, and so forth. The request may also include image(s), code, or the like comprising the VNFs A, B, and C, and any support data, variables, tables, etc. for providing and enabling operational instances of VNFs A, B, and C, or information regarding where to obtain such image(s), code, etc. along with sufficient information so as to enable the reservation of physical and virtual resources upon which to deploy service 180 and the VNFs A, B, and C, and/or any sub-components thereof. It should be noted that referred to herein a "service" may also comprise an "application," e.g., having a user interface and/or user-interactive functions. In other words, the term "service" is not restricted to computing functions that are without user interactions.

The request may be input via the VNF designer/service provider module 198 and may be passed to the request analyzer 111. The request analyzer 111 may parse the metadata of the request to determine that the request has been flagged as an "economic request" and that VNF C has a geographic restriction. The request analyzer 111 may set an indicator that an economic decomposition model should be used and may pass the request to request decomposer 112. The request decomposer 112 may then decompose the service in accordance with the economic decomposition model (e.g., decomposing into VNF A, VNF B, and VNF C). Although the present example is described in relation to decomposition of service 180 into component VNFs, it should be understood that in other examples, decomposition of a service may alternatively or additionally involve decomposition of one or more VNFs into component modules of such VNFs (and possible deployment of such modules to different clouds).

Next, the resource mapper and optimizer 113 may select respective deployment models for the different components. For instance, since the request is an economic request, the resource mapper and optimizer 113 may select a "least cost" deployment model for each of the VNFs A, B, and C. However, since VNF C has a geographic restriction, the resource mapper and optimizer 113 may instead select a "geographic" deployment model for VNF C. Continuing with the present example, resource mapper and optimizer 113 may determine that cloud 120 is the least cost by evaluating various rules of the deployment model against current and/or past data regarding the various clouds 120, 130, and 140, and the components thereof. The result may be a selection to deploy VNF B to cloud 120 according to the ruleset. However, in the present example, VNF A may be configured to run as a container via a containerization engine (e.g., rather than via a VM). In this case, resource mapper and optimizer 113 may determine that cloud 120 does not support containerization. As such, resource mapper and optimizer 113 may select to deploy VNF A to cloud 140, which may be the least cost option that offers containerization services. Finally, resource mapper and optimizer 113 may select to deploy VNF C to cloud 130. For instance, cloud 120 may not satisfy the geographic restriction for VNF C. However, cloud 130 may comprise the least cost option that satisfies the geographic restriction for VNF C. Resource mapper and optimizer 113 may obtain pricing, availability, and functionality information on an ongoing basis from clouds 120, 130, and 140, e.g., per hour costs of CPU, GPU, and memory resources, etc. at different levels of service.

The deployment decisions for the component VNFs A, B, and C of service 180 may then be provided to placing and tracking manager 114. Placing and tracking manager 114 may then send requests/instructions for the deployment of VNFs A, B, and C to clouds 140, 120, and 130, respectively. The requests/instructions may include requirements/preferences for the respective VNFs A, B, and C, the code, executable images, or the like and any supporting data for instantiating the respective VNFs, A, B, and C, and so forth. The respective clouds 120, 130, and 140 may then select physical and virtual resources for deployment of the respective VNFs A, B, and C. For instance, as illustrated in FIG. 1, the component VNFs A, B, and C of service 180 may be deployed as VNF 174 on node 170 in cloud 140, VNF 156 on node 150 in cloud 120, and VNF 165 on node 160 in cloud 130.

The placing and tracking manager 114 may create records for the deployments of the respective VNFs A, B, and C in MRL 190. The clouds 120, 130, and 140 may feed utilization data (e.g., performance, costs, etc.) regarding nodes 150, 160, 170, host hardware 151, 161, 171, hypervisors 153 and 162, host operating systems 152 and 172, VMs 154 and 163, OS 164, guest OS 155, containerization engine 173, and VNFs A, B, and C to MRL 190. In one example, the same information or at least a portion thereof may also be provided to resource topology module 116 for updating. In one example, MRL 190 may update various data records in different layers as the utilization data is received. Client device 185 may access such records as pertain to the deployed service 180, e.g., to audit that performance of the service 180 is as desired or expected, to confirm that costs are as anticipated, etc. For instance, the customer (e.g., the user of client device 185) may be provided with a single bill for the deployment of service 180. However, details from data records of MRL 190 may show which components are/were deployed on which cloud(s), using which resources, at which performance, at which cost, etc. The records of MRL 190 also allow VNF providers (e.g., of VNFs A, B, and C), the provider of service 180, etc. to confirm that the artificial intelligence (AI)/machine learning (ML) of the various models is/are properly selecting which clouds to use, to confirm that SFCs, VNFs, and/or components thereof are meeting performance goals, and so forth. Any one or more of these entities may possibly change preferences, which can be incorporated into metadata of the service 180, the VNFs A, B, or C, and so forth.

In one example, after deploying service 180 to the clouds 120, 130, and 140, the VNF designer/service provider module 198 may enable interaction of the customer via client device 185 with placing and tracking manager 114 and/or resource mapper and optimizer 113 so as to remap one or more components to a different cloud, or different clouds. In addition, in one example, data records of MRL 190 may indicate which network(s) connect which clouds. For example, each cloud 120, 130, and 140 may show perfect or at least compliant performance for VNFs A, B, and C, but the overall SFC or VNF performance of service 180 may be deficient. In this case, the linked data records of MRL 190 may show that one or more problems exist between clouds (rather than within the physical or virtual resources of clouds 120, 130, and 140).

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like, additional clouds, and so forth. Thus, these and other modifications are all contemplated within the scope of the present disclosure.

Figure 2:
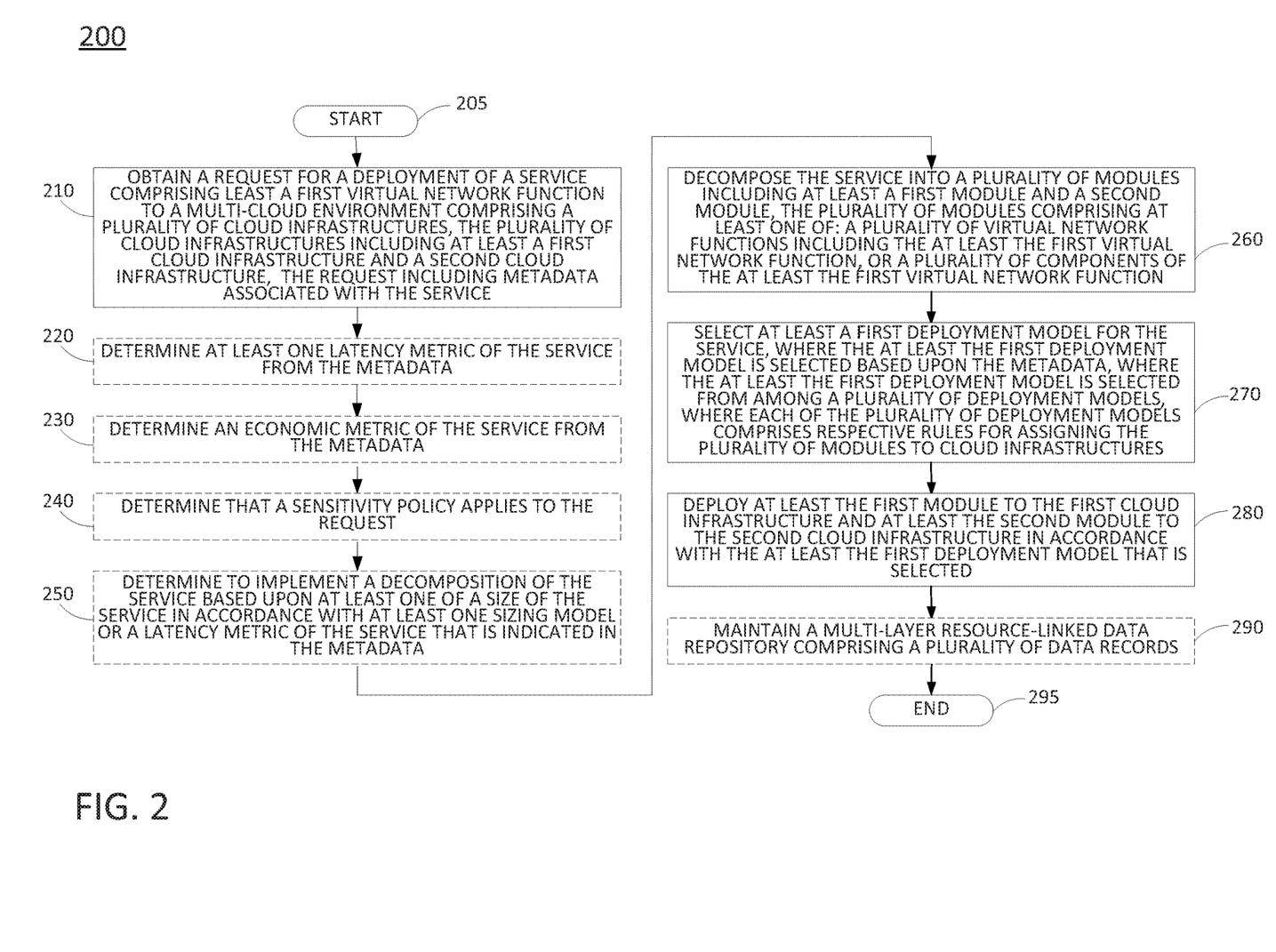
FIG. 2 illustrates a flowchart of an example method for deploying at least a first module of a service to a first cloud infrastructure and at least a second module of the service to a second cloud infrastructure in accordance with a deployment model for the service.

FIG. 2 illustrates a flowchart of an example method 200 for deploying at least a first module of a service to a first cloud infrastructure and at least a second module of the service to a second cloud infrastructure in accordance with a deployment model for the service, in accordance with the present disclosure. In one example, the method 200 is performed by a component of the system 100 of FIG. 1, such as by the service deployment platform 102, MRMP 110, MRL 190, and/or any one or more components thereof (e.g., a processor, or processors, performing operations stored in and loaded from a memory). In one example, the steps, functions, or operations of method 200 may be performed by a computing device or system 300, and/or processor 302 as described in connection with FIG. 3 below. For instance, the computing device or system 300 may represent any one or more components of a service deployment platform, MRMP, and/or a MRL that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains a request for a deployment of a service comprising at least a first VNF to a multi-cloud environment comprising a plurality of clouds, or cloud infrastructures, including at least a first cloud infrastructure and a second cloud infrastructure. The request may include metadata associated with the service, e.g., particular to the current request, the end-to-end service, the component VNF(s), and/or VNF sub-components, such as performance requirements, geographic restrictions, other flags/indicators, such as an "economic request" flag, a "maximum performance request" flag, or the like, time of day information, such as indicators of increased overnight loads and minimal daytime loads, a tracking/no tracking flag, and so forth. The request may also include image(s), code, or the like comprising the VNF(s), and any supporting data, variables, tables, etc. for providing and enabling operational instances of such VNF(s), or information regarding where to obtain such image(s), code, etc. along with sufficient information so as to enable the reservation of physical and virtual resources upon which to deploy the service and/or any modules thereof. In one example, step 210 may be performed in accordance with VNF designer/service provider module 198 and/or request analyzer 111 of the service deployment platform 102 of FIG. 1.

At optional step 220, the processing system may determine at least one latency metric of the service from the metadata. For instance, as noted above, the metadata may include an indication of a latency requirement and/or preference (broadly a latency metric) for the service. In one example, the at least one latency metric may be for the end-to-end service. Alternatively, or in addition, the at least one latency metric may be for a particular VNF, for a pair or other sequence of VNFs, etc.

At optional step 230, the processing system may determine an economic metric of the service from the metadata. For example, as noted above, the metadata may include economic criteria, such as, "least cost after peak hour" and "moderate cost during peak hour," a specific flag, such as an "economic request" flag, a maximum cost limit, and so forth.

At optional step 240, the processing system may determine that a sensitivity policy applies to the request. For instance, the sensitivity policy may comprise one or more constraints associated with an entity submitting the request, such as at least one geographic restriction for a deployment of at least one module of a plurality of modules of the service, at least one cloud infrastructure of the plurality of cloud infrastructures at which at least one module of the plurality of modules of the service is or is not permitted to be deployed, at least one equipment type at which at least one module of the plurality of modules of the service is or is not permitted to be deployed, and so on.

In one example, the sensitivity policy may be determined from the metadata associated with the service (e.g., metadata of the request, of the service, of the VNFs of the service, and/or of the sub-components thereof). For instance, the metadata may indicate that one or more VNFs, or the entire service should be deployed "USA only." Alternatively, or in addition, the sensitivity policy may be determined from an external submission from an entity associated with the request. For instance, a customer may request a customer-specific sensitivity policy be applied (e.g., to all requests for service deployment that may be submitted by and/or on behalf of the customer). Thus, this sensitivity policy may be stored by the processing system (such as via policy module 115 of FIG. 1) to be used in connection with service deployment requests. In one example, any one or more of the optional steps 220-240 may be performed in accordance with request analyzer 111 of the service deployment platform 102 of FIG. 1.

At optional step 250, the processing system may determine to implement a decomposition of the service based upon at least one of a size of the service in accordance with at least one sizing model or a latency metric of the service that is indicated in the metadata associated with the service. For example, step 250 may comprise an analysis of a request, including one or more of: a sizing analysis, a complexity analysis, a cost analysis, and a special rule analysis. To illustrate, the sizing analysis may include determining the scope/size of the request by first comparing to existing sizing models. Sizing models may include the duration of service (as indicated in the request), traffic volume anticipation, server requirements or preferences, redundancy requirements or preferences, latency requirements or preferences, and so forth. Again, the output of step 250 may be a decision of whether or not a decomposition is to be performed. In the present example, the request may be a "large" request or a "complex" request (e.g., complex in latency), and the decision may be to decompose.

At step 260, the processing system decomposes the service into a plurality of modules including at least a first module and a second module, where the plurality of modules comprises at least one of: a plurality of VNFs including the at least the first VNF, or a plurality of components of the at least the first VNF (e.g., VNF sub-components). For instance, step 260 may comprise decomposing the service into blocks of one or more VNFs, and/or by decomposing individual VNFs into sub-components. In one example, the decomposition follows a predetermined ruleset. For example, if a request is flagged as an "economic request," step 260 may include referencing a pricing table to determine how many and which components of the service, e.g., VNFs and/or VNF sub-modules, should be decomposed. Each decomposed piece that is selected may then be treated as a separately deployable piece. If, however, initial analysis determines that the request for service deployment is a complex task (e.g., having "latency complexity," etc.), step 260 may include calculating response times with a list of prebuilt models. For instance, the processing system may invoke each prebuilt model to obtain a respective decomposition result. After each model provides a decomposed result (e.g., one model may decompose to the sub-component level, while another model may decompose only to the VNF level), the candidate decomposition results may then be run through a latency calculator and an economic calculator. The best performing result (or a result with improved performance as compared to at least one or more other results) may then be selected.

In one example, the decomposing of the service into the plurality of modules may be in accordance with the at least one latency metric. For instance, if a latency preference is determined at optional step 220 indicating a maximum latency of 2 ms for a VNF of the service to complete its operations, the processing system may determine at step 260 that this VNF should not be decomposed into sub-components (and hence will be deployed to the same cloud infrastructure). Similarly, in one example, decomposing the service into the plurality of modules may be in accordance with the economic metric. For instance, the economic metric may indicate a preference for least-cost deployment. However, the processing system may determine from the resource topology that the least-cost cloud does not support containerization, whereas at least one VNF of the service may be restricted to a containerized deployment. In this case, while a default economic model may indicate to deploy all modules of the service to least-cost cloud, in this case, the processing system may decompose the service based upon at least this additional constraint.

At step 270, the processing system selects at least a first deployment model for the service, where the at least the first deployment model is selected based upon the metadata associated with the service, and where the at least the first deployment model is selected from among a plurality of deployment models. For instance, each of the plurality of deployment models may comprise respective rules for assigning service modules to cloud infrastructures. In one example, the processing system may select a deployment model from among a plurality of available deployment models (e.g., least cost, high availability, best available cloud platform to be hosted on, etc.).

The at least one deployment model may be selected in accordance with considerations of individually deployable components (e.g., on a module-by-module basis) as well in consideration of the end-to-end latency constraints. For instance, the at least one deployment model may comprise different deployment models selected for respective modules as identified via the decomposition of step 260. To illustrate, the at least the first deployment model may include a reduced-cost (e.g., a least-cost) deployment model that may be selected for a plurality of the modules of the service in accordance with the economic metric that may be determine at optional step 230. The at least the first deployment model may also include an increased performance (e.g., a best performance) deployment model that may be selected for at least one module of the service (e.g., for a VNF that has certain deployment restrictions and that may not be deployable to a least-cost cloud solely based upon economic criteria). The at least the first deployment model may alternatively or additionally comprise a diverse deployment model, a security-focused deployment model, or any number of deployment models having different focuses. In one example, step 270 may be performed in accordance with resource mapper and optimizer 113 of the service deployment platform 102 of FIG. 1.

At step 280, the processing system deploys at least the first module to the first cloud infrastructure and at least the second module to the second cloud infrastructure in accordance with the at least the first deployment model that is selected. In one example, step 280 may include selecting the deployment of at least the first module of the plurality of modules to the first cloud infrastructure and the deployment of at least the second module of the plurality of modules to the second cloud infrastructure based upon performance metrics of the first cloud infrastructure and performance metrics the second cloud infrastructure. For instance, the costs of deployment to each of the clouds (cloud infrastructure) may dynamically change, the availability of physical or virtual resources of the clouds may change, and so forth. Thus, a selection of a deployment of a module to a given cloud may be different from a selection of a deployment of the same service module using the same deployment model, but at a different time. In one example, the processing system may send requests/instructions for the deployment of the first module to the first cloud infrastructure and for the deployment of the second module to the second cloud infrastructure. The instructions may include requirements/preferences for the respective modules, the code, executable images, or the like, and any supporting data for instantiating the respective modules, and so forth. The respective cloud infrastructures may then select physical and virtual resources for deployment of the respective modules. In one example, step 280 may be performed in accordance with placing and tracking manager 114 of the service deployment platform 102 of FIG. 1.

It should be noted that the foregoing may be superseded by a sensitivity policy (e.g., as determined at optional step 240). For instance, a customer may notify the operator of the processing system that services for this customer may only be deployed to physical resources in the United States and/or only to clouds controlled by entities domiciled in the United States. Thus, if the processing system determines that a deployment model is recommending/selecting to run one or more modules outside of the United States, this recommendation may be discarded in accordance with the policy. It should be noted that similar preferences/requirements may also be written into metadata of the service, metadata of the VNFs or other components thereof, or metadata of the request for deployment of the service (e.g., for application on a per-service or per-request basis, for redundancy purposes, etc.). These per-request or per-service sensitivity policies may similarly supersede recommendations of deployment models that may contradict the sensitivity policy.

Alternatively, or in addition, the decomposition model may be selected to satisfy the sensitivity policy. For instance, there may be an "economic decomposition" model that may be specific to a particular customer and the customer's sensitivity policy, or to a sensitivity policy that may be indicated in the request. For instance, this economic decomposition model may balance economic considerations of whether and how to decompose the service while complying with the sensitivity policy (e.g., to ensure that the sensitivity policy is not violated). Similarly, a deployment model may comprise an "economic deployment" model that is specific to the sensitivity policy such that the ruleset of the model provides for placing modules of the service at appropriate clouds to minimize cost, while also ensuring that the sensitivity policy is not violated. Thus, the sensitivity policy may affect the performance or either or both of steps 270 and 280.

At optional step 290, the processing system may maintain a multi-layer resource-linked data repository comprising a plurality of data records. For instance, in one example, each of the plurality of data records is for a resource of a plurality of resources of the multi-cloud environment. Each of the plurality of resources may comprise one of: one of the plurality of modules, the first VNF or a different VNF, a VM, a virtualization container, the service or a different service, one of the cloud infrastructures, or a physical component of one of the cloud infrastructures. In one example, each data record of the plurality of data records may include at least one of: performance metrics of a resource associated with the data record (e.g., utilization, availability, latency, etc.), or cost metrics of the resource associated with the data record (e.g., a per minute utilization cost, a per hour utilization cost, a cost incurred with respect to one or more particular services and/or service modules that may utilize the resource, and so on).

In one example, the multi-layer resource-linked data repository may comprise a plurality of layers for the plurality of data records, such as: a physical resource layer, a virtual machine/container layer, a virtual network function layer, and a service function chain layer. For instance, the layers may correspond to the physical resource records 191, the VM/container records 192, the VNF records 193, and the service records 194 of the MRL 190 of FIG. 1. In one example, the multi-layer resource-linked data repository may also include data records in a cloud infrastructure layer.

In one example, the multi-layer resource-linked data repository may include linkages among the plurality of data records, wherein the linkages are based upon at least a first deployment topology of the service (e.g., and including other deployment topologies related to other requests). For instance, the deployment topology may comprise the deployment of at least the first module to the first cloud infrastructure and at least the second module to the second cloud infrastructure. In one example, the plurality of data records may be stored as a graph database.

To illustrate, a service record for the service may include linkages to VNF records for any component VNFs of the service. In addition, the VNF records may include linkages to respective VM/container records associated with the VM and/or containers to which the VNFs are deployed. Similarly, the VM/container records may include linkages to records of physical resources on which the respective VMs and/or containers are deployed. Thus, for instance, a client submitting the request may be permitted access to all of these linked record via an initial access to a service record associated with the service. However, it should be noted that in some examples, a client may request and access a record from a layer without first accessing a linked service record. For instance, if the client is permitted to access a VM/container record because the associated VM/container supports a service of the client, the record may be delivered to the client without first requiring access to a linked service record.

Following step 280 or optional step 290, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-290 for different service deployment requests. In one example, the method 200 may be expanded to include obtaining performance data of the cloud infrastructures to build, update, and/or maintain a resource topology of the multi-cloud environment, e.g., in addition to maintaining the multi-layer resource-linked data repository. In one example, the method 200 may be expanded to include receiving requests for data records, verifying that access of the requester(s) is/are permitted, and delivering data records of the multi-layer resource-linked data repository to the requester(s). In another example, the method 200 may include obtaining decomposition models and/or deployment models from customers/clients, from an administrator of the processing system, etc.

In still another example, the method 200 may be expanded to include continuing to monitor performance metrics of the various cloud infrastructures and reconfiguring the deployment of at least the first module to the first cloud infrastructure and/or the deployment of at least the second module to the second cloud infrastructure. For instance, as noted above, the metadata associated with the request may indicate an "economic request" with time of day preferences. In such an example, the processing system may perform an additional iteration of steps 250-280, which may result in a deployment of one or both modules to a different cloud infrastructure. For instance, the modules may both be deployed on non-USA cloud infrastructure, but at a later time (such as during overnight hours in the USA) costs may drop significantly, such that one or both modules may instead be transferred and/or redeployed to USA-based cloud(s)/cloud infrastructure(s). Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for deploying at least a first module of a service to a first cloud infrastructure and at least a second module of the service to a second cloud infrastructure in accordance with a deployment model for the service, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for deploying at least a first module of a service to a first cloud infrastructure and at least a second module of the service to a second cloud infrastructure in accordance with a deployment model for the service (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for deploying at least a first module of a service to a first cloud infrastructure and at least a second module of the service to a second cloud infrastructure in accordance with a deployment model for the service (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a request for a deployment of a service comprising at least a first virtual network function to a multi-cloud environment comprising a plurality of cloud infrastructures, wherein the plurality of cloud infrastructures includes at least a first cloud infrastructure and a second cloud infrastructure, wherein the request includes metadata associated with the service;

decomposing, by the processing system, the service into a plurality of modules including at least a first module and a second module, wherein the plurality of modules comprises at least one of: a plurality of virtual network functions including the at least the first virtual network function, or a plurality of components of the at least the first virtual network function;

selecting, by the processing system, at least a first deployment model for the service, wherein the at least the first deployment model is selected based upon the metadata, wherein the at least the first deployment model is selected from among a plurality of deployment models, wherein each of the plurality of deployment models comprises respective rules for assigning the plurality of modules to cloud infrastructures, wherein the plurality of deployment models includes at least: a reduced cost deployment model to cause the processing system to select a first set of cloud infrastructures of the plurality of cloud infrastructures having a lower cost of deployment as compared to other sets of cloud infrastructures of the plurality of cloud infrastructures, and an increased performance deployment model to cause the processing system to select a second set of cloud infrastructures of the plurality of cloud infrastructures having a greater performance as compared to other sets of cloud infrastructures of the plurality of cloud infrastructures; and deploying, by the processing system, the first module to the first cloud infrastructure and the second module to the second cloud infrastructure in accordance with the at least the first deployment model that is selected.

2. The method of claim 1, further comprising:
determining to implement a decomposition of the service based upon at least one of: a size of the service in accordance with at least one sizing model or a latency metric of the service that is indicated in the metadata.

3. The method of claim 1, further comprising:
determining the at least one latency metric of the service from the metadata, wherein the decomposing comprises:
decomposing the service into the plurality of modules in accordance with the at least one latency metric.

4. The method of claim 1, further comprising:
determining an economic metric of the service from the metadata.

5. The method of claim 4, wherein the decomposing comprises:
decomposing the service into the plurality of modules in accordance with the economic metric.

6. The method of claim 4, wherein the at least the first deployment model is selected in accordance with the economic metric.

7. The method of claim 1, further comprising:
determining that a sensitivity policy applies to the request.

8. The method of claim 7, wherein the sensitivity policy is determined from the metadata associated with the service or from an external submission from an entity associated with the request.

9. The method of claim 7, wherein the decomposing comprises:
decomposing the service into the plurality of modules in accordance with the sensitivity policy.

10. The method of claim 7, wherein the at least the first deployment model is selected in accordance with the sensitivity policy.

11. The method of claim 7, wherein the sensitivity policy comprises one or more constraints associated with an entity submitting the request.

12. The method of claim 11, wherein the one or more constraints comprise at least one of:
at least one geographic restriction for a deployment of at least one module of the plurality of modules of the service;
at least one cloud infrastructure of the plurality of cloud infrastructures at which at least one module of the plurality of modules of the service is permitted to be deployed; or
at least one equipment type at which at least one module of the plurality of modules of the service is permitted to be deployed.

13. The method of claim 1, wherein the plurality of deployment models further includes:
a diverse deployment model; and
a security-focused deployment model.

14. The method of claim 13, wherein the deploying in accordance with the at least the first deployment model that is selected comprises:
selecting the deployment of the first module of the plurality of modules to the first cloud infrastructure and the deployment of the second module of the plurality of modules to the second cloud infrastructure based upon performance metrics of the first cloud infrastructure and performance metrics of the second cloud infrastructure.

15. The method of claim 1, further comprising:
maintaining a multi-layer resource-linked data repository comprising a plurality of data records, wherein each of the plurality of data records is for a resource of a plurality of resources of the multi-cloud environment, wherein each of the plurality of resources comprises one of:
one of the plurality of modules;
the first virtual network function or a different virtual network function;
a virtual machine;
a virtualization container;
the service or a different service;
a physical component of one of the plurality of cloud infrastructures; or
one of the plurality of cloud infrastructures.

16. The method of claim 15, wherein each data record of the plurality of data records includes at least one of:
performance metrics of a resource associated with the data record; or
cost metrics of the resource associated with the data record.

17. The method of claim 16, wherein the multi-layer resource-linked data repository comprises a plurality of layers for the plurality of data records, the plurality of layers comprising at least:
a physical resource layer;
a virtual machine/container layer;
a virtual network function layer; and
a service function chain layer.

18. The method of claim 15, wherein the multi-layer resource-linked data repository includes linkages among the plurality of data records, wherein the linkages are based upon at least a first deployment topology of the service.

19. A non-transitory computer-readable medium storing instructions which, when executed by a processing system including at least one processor, cause the processing system to perform operations, the operations comprising:

obtaining a request for a deployment of a service comprising at least a first virtual network function to a multi-cloud environment comprising a plurality of cloud infrastructures, wherein the plurality of cloud infrastructures includes at least a first cloud infrastructure and a second cloud infrastructure, wherein the request includes metadata associated with the service;

decomposing the service into a plurality of modules including at least a first module and a second module, wherein the plurality of modules comprises at least one of: a plurality of virtual network functions including the at least the first virtual network function, or a plurality of components of the at least the first virtual network function;

selecting at least a first deployment model for the service, wherein the at least the first deployment model is selected based upon the metadata, wherein the at least the first deployment model is selected from among a plurality of deployment models, wherein each of the plurality of deployment models comprises respective rules for assigning the plurality of modules to cloud infrastructures, wherein the plurality of deployment models includes at least: a reduced cost deployment model to cause the processing system to select a first set of cloud infrastructures of the plurality of cloud infrastructures having a lower cost of deployment as compared to other sets of cloud infrastructures of the plurality of cloud infrastructures, and an increased performance deployment model to cause the processing system to select a second set of cloud infrastructures of the plurality of cloud infrastructures having a greater performance as compared to other sets of cloud infrastructures of the plurality of cloud infrastructures; and deploying the first module to the first cloud infrastructure and the second module to the second cloud infrastructure in accordance with the at least the first deployment model that is selected.

20. An apparatus comprising:

a processing system including at least one processor; and a computer-readable medium storing instructions which, when executed by the processing system, cause the processing system to perform operations, the operations comprising:

obtaining a request for a deployment of a service comprising at least a first virtual network function to a multi-cloud environment comprising a plurality of cloud infrastructures, wherein the plurality of cloud infrastructures includes at least a first cloud infrastructure and a second cloud infrastructure, wherein the request includes metadata associated with the service;

decomposing the service into a plurality of modules including at least a first module and a second module, wherein the plurality of modules comprises at least one of: a plurality of virtual network functions including the at least the first virtual network function, or a plurality of components of the at least the first virtual network function;

selecting at least a first deployment model for the service, wherein the at least the first deployment model is selected based upon the metadata, wherein the at least the first deployment model is selected from among a plurality of deployment models, wherein each of the plurality of deployment models comprises respective rules for assigning the plurality of modules to cloud infrastructures, wherein the plurality of deployment models includes at least: a reduced cost deployment model to cause the processing system to select a first set of cloud infrastructures of the plurality of cloud infrastructures having a lower cost of deployment as compared to other sets of cloud infrastructures of the plurality of cloud infrastructures, and an increased performance deployment model to cause the processing system to select a second set of cloud infrastructures of the plurality of cloud infrastructures having a greater performance as compared to other sets of cloud infrastructures of the plurality of cloud infrastructures; and deploying the first module to the first cloud infrastructure and the second module to the second cloud infrastructure in accordance with the at least the first deployment model that is selected.

\* \* \* \* \*